Dec. 21, 1965   R. C. THOR   3,225,349
MOVING TARGET INDICATING RADAR SYSTEM
Filed Dec. 17, 1962   5 Sheets-Sheet 1

INVENTOR:
ROBERT C. THOR,
BY *Richard V. Lang*
HIS ATTORNEY.

Dec. 21, 1965    R. C. THOR    3,225,349
MOVING TARGET INDICATING RADAR SYSTEM
Filed Dec. 17, 1962    5 Sheets-Sheet 2

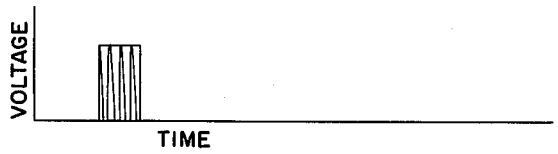
FIG.2
A COMPRESSED PULSE

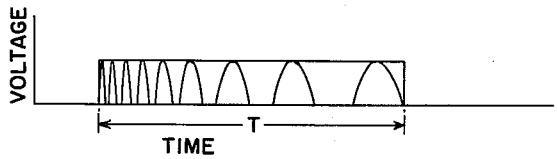
B EXPANDED PULSE

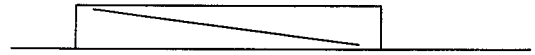
C SYMBOL

FIG.3
A — OUTPUT OF PULSE SOURCE 10
B — OUTPUT OF FILTER 12
C — OUTPUT OF FILTER 16
D — OUTPUT OF FILTER 14
E — OUTPUT OF FILTER 18
F — OUTPUT OF ADDER 20

FIG.4
A OUTPUT OF RECEIVER 25
B OUTPUT OF FILTER 12
C OUTPUT OF FILTER 16
D OUTPUT OF LIMITER 13
E OUTPUT OF LIMITER 17
F OUTPUT OF FILTER 14
G OUTPUT OF FILTER 18
H OUTPUT OF DELAY NETWORK 19

INVENTOR:
ROBERT C. THOR,
BY *Richard V. Lang*
HIS ATTORNEY.

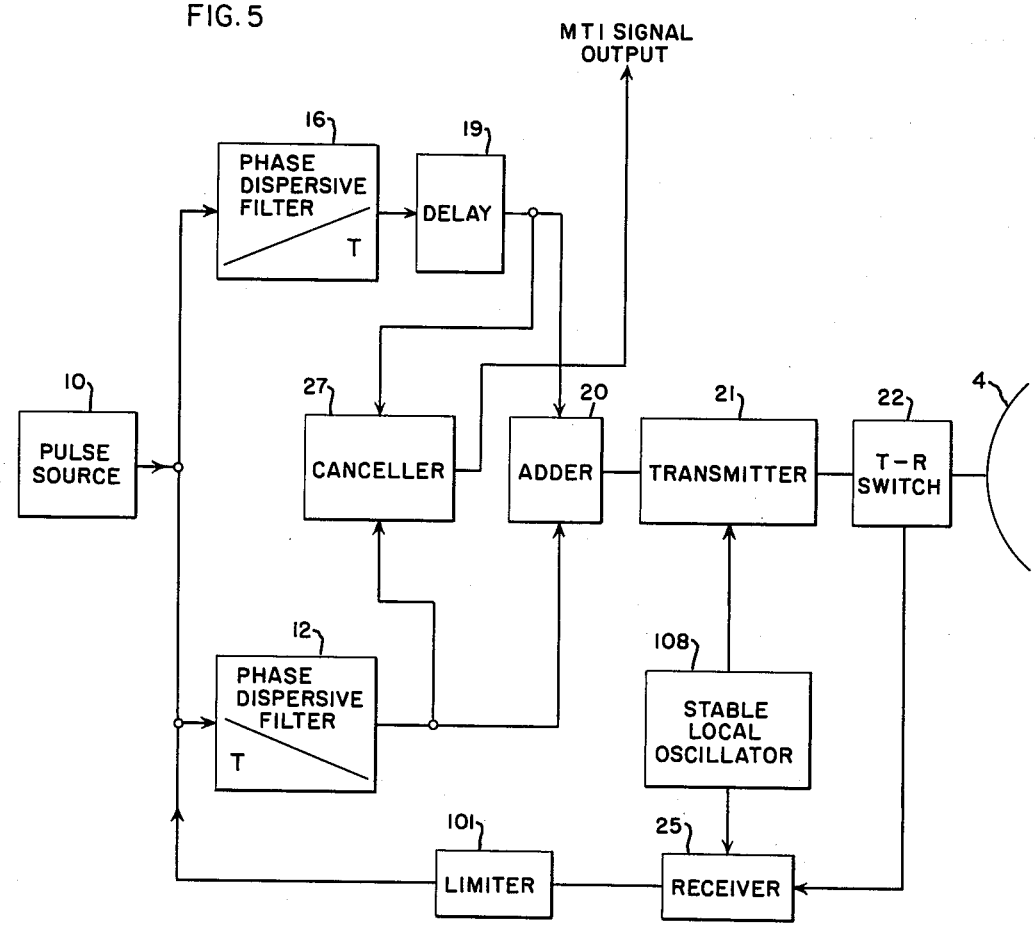

Dec. 21, 1965   R. C. THOR   3,225,349
MOVING TARGET INDICATING RADAR SYSTEM
Filed Dec. 17, 1962   5 Sheets-Sheet 4

INVENTOR:
ROBERT C. THOR,
BY *Richard V. Lang*
HIS ATTORNEY.

Dec. 21, 1965   R. C. THOR   3,225,349
MOVING TARGET INDICATING RADAR SYSTEM
Filed Dec. 17, 1962   5 Sheets-Sheet 5

INVENTOR:
ROBERT C. THOR,
BY *Richard V. Lang*
HIS ATTORNEY.

3,225,349
MOVING TARGET INDICATING RADAR SYSTEM
Robert C. Thor, Liverpool, N.Y., assignor to General
Electric Company, a corporation of New York
Filed Dec. 17, 1962, Ser. No. 245,077
24 Claims. (Cl. 343—7.7)

This invention relates to a target detecting radar system and, in particular, to a radar system for detecting targets having a radial velocity relative to the system.

A radar system, in general, includes a transmitter adapted to radiate short duration, high frequency, pulses of electromagnetic energy and a receiver responsive to the echo pulses returned when the radiated pulses impinge upon an object. The information provided by the echo pulses is derived and presented on an indicating device.

A radar system which is adapted to distinguish between fixed objects and moving objects and which applies to the indicating device signals representing moving targets only is referred to as a moving target indicating (MTI) system. Distinction between moving and fixed targets is normally attained by utilizing the Doppler effect, i.e., the phase change of the echo with respect to the transmitted pulse due to the radial velocity of the target with respect to the radar system. In contrast, the phase relationship between a transmitted pulse and an echo resulting from a fixed target is the same for successive pulses. The fact that for successive pulses the relative phase of the transmitted pulse and the echo varies when the target is moving, and is constant when the target is fixed, provides a means for distinguishing between fixed and moving targets.

Conventional moving target indicating systems employ coherent oscillators to provide a reference signal having a phase related to the phase of the transmitted pulse, the phase of the echo signal being compared with the phase of the reference signal. Echoes from fixed targets have the same phase relative to the reference signal from pulse to pulse whereas the phase, relative to the reference signal, of the echoes resulting from a radially moving target continually changes, because of the fact that the distance from the radar system to the target is changing. Consequently, comparison of the phases of successive echoes relative to the reference signal provides information as to the nature of the target giving rise to the echo, echoes due to stationary targets cancelling and echoes due to radially moving targets resulting in a residual output signal. Successive pulse comparison may be effected by delaying the earlier of two successively received echo pulses for a period equal to the interval between transmitted pulses.

One type of prior art moving target indicating system periodically transmits a group of two pulses at a predetermined repetition frequency, the Doppler phase-shift produced between the two pulses of a group being utilized to detect moving targets. An important advantage of this type of system is the effective elimination of so-called "blind speeds" by closely spacing the pulses of a group. "Blind speeds" result from the failure of a moving target indicating system to detect phase changes of whole cycles from objects which move toward or away from the radar system a distance equal to an integral number of half-wave lengths of the transmitted radio frequency energy during the interval between pulses. Another advantage of the two-pulse group is the effective increase in range of the radar system due to the fact that the repetition frequency can be decreased without increasing the size and complexity of the storage elements used for pulse-to-pulse comparison.

However, prior art MTI radar systems of this type have been extremely complex, requiring a plurality of coherent phase detectors, and delay circuits, with oscillators to maintain proper phase relations within the system, resulting in high cost and decreased reliability. The moving target indicating radar system of the present invention eliminates "blind speeds" and effectively increases the range of the system while employing fewer components with resulting lower cost and complexity and increased reliability.

It is an object of the invention to provide an improved moving target indicating radar system.

It is another object of the invention to provide an improved moving target indicating radar system with increased range capability.

It is another object of the invention to provide an improved moving target indicating radar system which facilitates extraction of moving target information from the returned echo pulses.

It is a further object of the invention to provide an improved moving target indicating radar system which compensates for phase instabilities within the system and which accurately maintains the phase relationship between two successive pulses to effect fixed target cancellation.

It is another object of the invention to provide an improved target motion indicating radar system in which stationary targets or targets moving at a preselected speed may be removed from the target indicator.

Briefly stated, in accordance with one illustrated embodiment of the invention, a pulse source which generates radio frequency drive pulses at a predetermined pulse repetition frequency is connected to the inputs of a pair of channels. The first channel includes a phase-dispersive filter, having a first phase-slope dispersion characteristic, while the second channel has a phase dispersive filter having a phase slope dispersion characteristic which is the negative of the first filter. The second channel also includes a delay network for delaying the signal in the second channel a predetermined period. The first channel generates a lengthened frequency modulated pulse having a predetermined phase-slope dispersion in response to an applied drive pulse from the pulse source, while the second channel generates a lengthened frequency modulated pulse having a phase dispersion whose slope is the negative of that of the pulse generated in the first channel and delayed for a predetermined period with respect thereto also in response to the same applied pulse from the pulse source. The pulse group comprising the output of the first and the second channels is transmitted periodically as each drive pulse is applied and the reflected echoes, including those have Doppler shifts introduced by targets moving radially with respect to the radar system but displaying the same sequence and approximately the same phase-slope dispersion characteristics, are received and applied to the inputs of the first and second channels. Due to the "matched" or "conjugate" phase-dispersive characteristics of the filters in the respective channels, the first channel operates in reception upon the reflected pulse originally generated in the second channel and compresses it thus resynthesizing or reconstituting a short duration pulse like the original, while the second channel operates in reception upon the reflected pulse generated in the first channel, compressing it to reconstitute a short duration pulse like the original and delaying it for the predetermined period. The two resulting reconstituted pulses of each group, each of which has now been equally delayed, appear at the same instant in time and are substractively combined in a suitable combining network. In the usual application, fixed target information is cancelled out and moving target information is derived for application to a display device.

Another emobdiment is provided, wherein each channel employs two phase-dispersive filters, the respective filters of the same channel having slopes of opposite sign and mutual gain bandwidths in the ratio of 1 to 2, with an amplitude limiter interposed. This combination achieves a higher degree of discrimination between the reconstituted pulse and the un-reconstituted pulse than the simpler embodiments.

The invention may be applied to arrangements wherein the phase dispersion is parabolic to achieve linear frequency modulation or logarithmic to achieve hyperbolic frequency modulation. The use of logarithmic phase modulation, when the product of the compression ratio and target velocity are high, illuminates the mismatch of the receiver to the echo modified by the target motion. The dispersive filtering channels are related to one another in the sense which is popularly referred to as "matched." By this one means that the transfer function of one filtering channel is the complex conjugate of the transfer function of the other filtering channel except for a constant delay term and an amplitude term. The term "matched filter" has been so defined and its basic import explained in the "Matched Filter Issue" of the IRE Transactions on Information Theory of June, 1960. Particular reference is made to pages 311 and 312 of the article entitled "Introduction to Matched Filters" by Mr. G. L. Turin appearing in said transactions. The terms "complex conjugate" or "conjugate" will be used hereafter in the specification and claims in the same broad sense in which the term "matched" has been defined above. In other words, it will include the case in which there is a departure from a true mathematical conjugate, but only in respect to a constant delay term and an amplitude term.

The subject matter of the invention is particularly pointed out and distinctly claimed in the concluding portion of the specification. The invention, however, both as to organization and method of operation may best be understood by reference to the following description taken in connection with the accompanying drawing in which:

FIGS. 2A–2C illustrate diagrammatically the nature of the pulses present in a pulse compression system;

FIGS. 3A–3F illustrate diagrammatically the nature of the pulses appearing at various points in the moving target indicating radar system of FIG. 1 during transmission;

FIGS. 4A–4H illustrate diagrammatically the nature of the pulses appearing at various points in the moving target indicating radar sytsem of FIG. 1 during reception of returned echoes;

FIG. 5 is a block diagram representation of a moving target indicating radar system embodying the invention and representing a simplification of the embodiment illustrated in FIG. 1;

Figure 1:
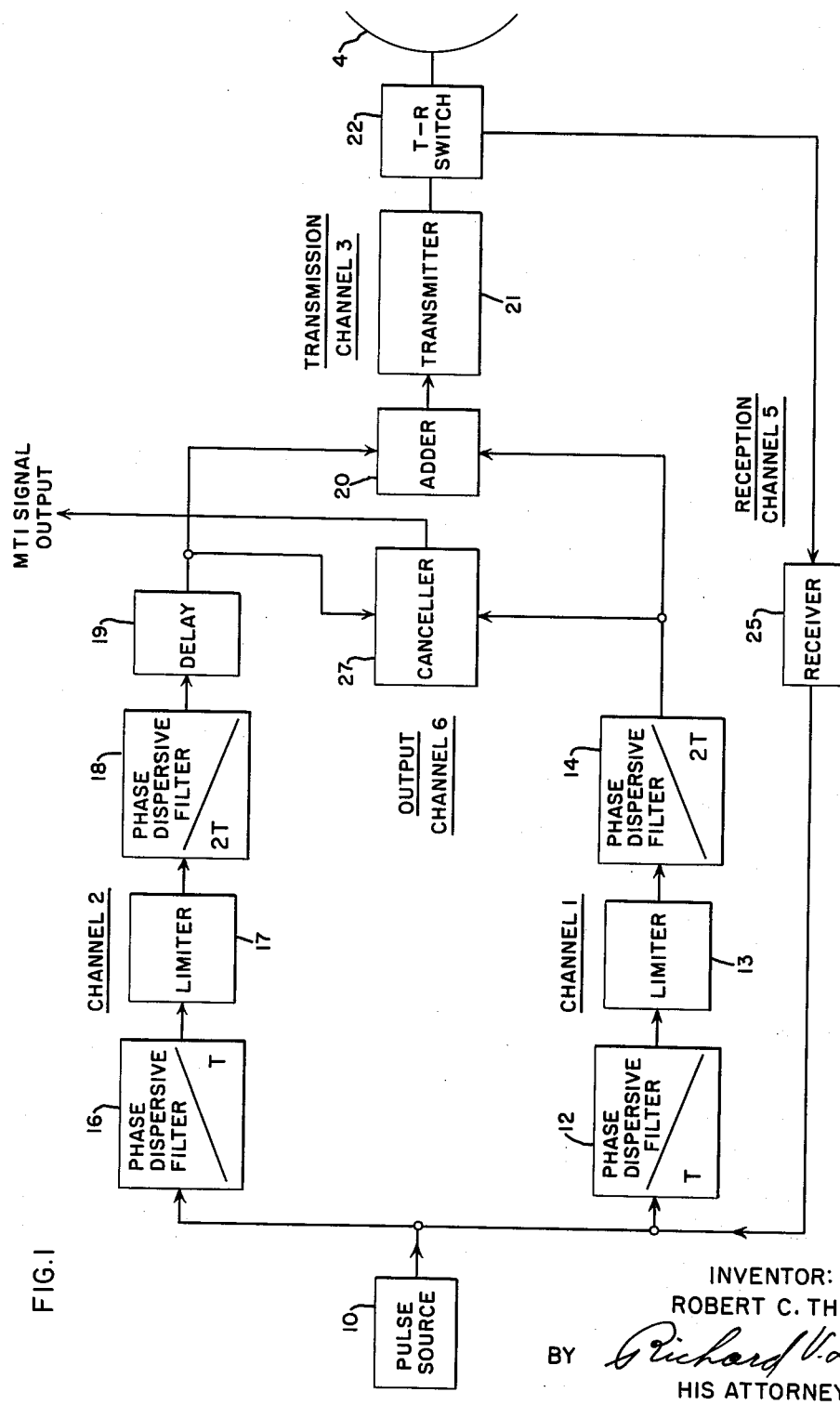
FIG. 1 is a block diagram representative of a moving target indicating radar system embodying the invention employing pulse groups of two.

With reference to FIG. 1, the moving target indicating system of the invention, considered as a whole, comprises two pulse compression channels 1 and 2 directed to the synthesis of two pulse groups and the application of pulse compression techniques to these pulses in both transmision and reception; a transmission channel 3, including power amplifier means, a reception channel 5, suitable radiation means 4 used in common by the transmision and reception channels and an MTI output channel 6. The pulse compression channels 1 and 2 are adapted to generate from a single short duration radio frequency pulse a group of two expanded pulses, each having a time duration T. The output pulse of channel 2 is delayed for a predetermined period with respect to the output pulse of channel 1. The two-pulse group, which is repeated at the group repetition period (GRP) in response to the application of pulses, is applied through the transmision channel 3 to the antenna 4 which radiates the pulse group, usually in a directional beam. The returning echo pulses, reflected from both fixed and moving targets are received by antenna 4 and by the application of conventional duplexing techniques applied through reception channels 5 to the pulse compression channels 1 and 2. These channels then separately derive pulses resembling the short duration original pulses and apply them after mutual cancellation for elimination of stationary target returns to the MTI output channel 6. Channel 6 contains only the desired moving target information.

In accordance with the invention, channels 1 and 2 incorporate phase-dispersive filters having amplitude and phase characteristics necessary for implementation of pulse compression techniques. To illustrate, there is shown in FIG. 2A a short duration radio frequency pulse having a frequency spectrum wide enough that, over a band corresponding to the desired waveform spectrum, the amplitude spectrum is uniform and the phase spectrum is linear with frequency. (In such a pulse, frequency modulation does not exist because deviation of the instantaneous frequency is proportional to the rate of change of phase, and the phase spectrum has been specified to be linear with frequency.) When this pulse is passed through a phase-dispersive network, i.e., a network introducing phase variation, such that the amount of phase delay imposed by the network upon the lower frequencies frequencies contained within the pulse, different portions of the pulse, being at different frequencies, are delayed by different amounts. The resulting pulse is frequency modulated and of increased length. Hence, if the phase delay imposed by the network upon the lower frequencies is greater than the phase display imposed upon the higher frequencies, a pulse of increased length having a non-linear phase dispersion, such as illustrated in FIG. 2B, is produced. The phase-slope dispersion of the elongated pulse of FIG. 2B wherein the higher frequencies are adjacent the leading edge of the pulse and the lower frequencies are adjacent the trailing edge is said to be negative and the phase-dispersive characteristics of the pulse and the network which produces it may be illustrated diagrammatically, as shown in FIG. 2C, by means of a diagonal line having a negative slope.

Compression of an elongated pulse may be effected by passing it through a network having a phase dispersion characteristic opposite that of the network in which the elongated pulse was generated. Such a filter is said to be a phase-matched receiver for the elongated pulse. Hence, compression of the elongated pulse of FIG. 2B may be effected by applying it to a filter having a positive phase-slope dispersion such that the phase delay imposed by the network upon the high frequency components is greater than that imposed upon the low frequency components. The result is a decrease in the length of the pulse, i.e., a compression of the pulse, since the trailing edge tends to overtake the leading edge and a resynthesis or reconstitution of the initial short duration pulse.

It is often desirable in a radar system utilizing pulse compression techniques to employ phase-dispersive filters having parabolic phase dispersion characteristics and hence producing, in response to an applied impulse, an elongated pulse which is linearly frequency modulated. Such a filter is termed a LIFMOP (linear frequency modulated pulse) filter and the resulting elongated waveform is termed a LIFMOP waveform. In a moving target indicating system of the invention, use of the LIFMOP wave form enables phase-matching of Doppler shifted signals with a single filter.

The LIFMOP waveform is particularly suitable to use with moving targets of average or low radial velocities. In the event that higher target velocities are involved, it may be desirable to use the invention with what has been termed the LOGMOP waveform. This waveform utilizes logarithmic phase modulation to achieve hyperbolic frequency modulation and reduces the deteriorating effect of higher target velocities upon the compressive aspects of the system. The advantage of using the LOGMOP waveform and the LIFMOP waveform, which is usually regarded as a special case of the LOGMOP waveform, is that the same phase-matching networks may be used in reception as were used in transmission. In the event that a waveform of this species is not used, an array of parallel phase-matching networks each designed for a particular Doppler shift, would have to be assembled in the receiver.

For a more complete discussion of pulse compression utilizing the LIFMOP waveform, reference is made to an article by H. O. Ramp and E. R. Wingrove entitled "Principles of Pulse Compression" appearing at pages 109–116 of volume MIL–5, No. 2, of the IRE Transactions on Military Electronics for April, 1961. Pulse compression utilizing the LOGMOP waveform is discussed in an article by R. C. Thor entitled "A Large Time Bandwidth Product Pulse Compression Technique" commencing on page 169 of volume MIL–6, No. 2 of the IRE Transactions on Military Electronics for April, 1962.

Considering the arrangement of the block diagram in FIG. 1 in greater detail, the generation of the two pulse groups in channels 1 and 2 is controlled by a radio frequency pulse fed by the source 10, the repetition frequency of pulse source 10 determining the group repetition period (GRP) of the system. Typically, the duration of the initial radio frequency pulse is of one-half microsecond having a carrier frequency of 10 megacycles, this selection being appropriate for a range resolution of 300 meters. In general, the initial drive pulses should have a frequency spectrum wide enough so that, over a band corresponding to the desired waveform spectrum, the amplitude spectrum is uniform and the phase spectrum is linear with frequency.

Channel 1 includes a first phase dispersive filter 12 which is connected to the pulse source 10. Filter 12 has a bandwith selected to accommodate one megacycle at a 10 megacycle center frequency, and a predetermined time bandwidth product and phase-slope dispersion of 200. Arbitrarily, the phase-slope dispersion of the first channel is negative as indicated by the diagonal line of negative slope within the block.

The dispersive filter 12 in a system having one megacycle bandwidth, may employ a solid state dispersive delay line typically using aluminum, steel or vibraloy in wires of five to fifteen mils in diameter. One may also use dispersive delay lines formed by cascaded symmetrical bridged-T networks, employing lumped constant impedance elements in the contemplated system. In this and other practical applications a rather large number (100) of these filter sections may be cascaded to achieve bandwidths of 30 to 40 percent of the intermediate frequency and time bandwidth products on the order of 100 to 1 or higher. At the frequencies suggested, solid delay lines though simpler in construction have somewhat narrower bandwidths and produce larger attenuations which must be made up with suitable amplifiers. At higher bandwidths resort to filters, each having multiple channels for separate segments of the frequency spectrum may be required. Such a filter is described in U.S. application S.N. 706,048 filed on a Radar System by R. C. Thor and E. L. Wingrove.

A limiter 13, whose use is primarily confined to reception and which does not change the waveform significantly during transmission, is connected to the output of the phase dispersive filter 12. This limiter is characterized by high phase stability and may take the form described in the paper entitled "Phase Stable Limiting IF Amplifiers Using Beam Deflection Tubes" by Dr. E. R. Wingrove, Jr. appearing in the Proceedings of the Fourth National Conference on Military Electronics of June, 1960. The output of the limiter is connected to a second phase dispersive filter 14. Filter 14 may be of the same general construction as filter 12 and should have a bandwidth and central frequency identical to that of the filter 12. The filter 14 has a time-bandwidth product or dispersion twice that of filter 12, the latter characteristic in conjunction with filter 12 enables filter 14 to generate a pulse having a time duration equal to that of the pulse generated by filter 12 alone but of inverted dispersion since, the phase-slope dispersion of filter 14 is positive, as indicated by the diagonal line of positive slope within the block. Filters 12 and 14 are so-called LIFMOP filters in that they introduce linear frequency modulation into an expanded pulse.

Channel 2 is similar to channel 1 with a first phase-dispersive filter 16, connected to pulse source 10, having a bandwidth, center frequency, and time-bandwidth product or dispersion identical with that of filter 12. However, filter 16 is complementary to filter 12 since the phase-slope dispersion is positive, as indicated. A limiter 17 is connected to the output of filter 16 while a second phase-dispersive filter 18 is connected to the output of limiter 17, limiter 17 being effective only during reception and not changing the transmitted waveform significantly. Phase-dispersive filter 18 has a bandwidth, center frequency, and a time-bandwidth product identical with that of filter 14, but is complementary to filter 14 since the phase-slope dispersion is negative, as indicated. Filters 16 and 18 are so-called LIFMOP filters.

The generation of a two-pulse group in response to a single impulse from pulse source 10 is achieved by delay line 19, which delays the output pulse of filter 18 a predetermined period T with respect to the output pulse of filter 14. Delay line 19 may, for example, be a quartz delay line having a delay of several hundred microseconds, and a bandwidth compatible with the 1 megacycle bandwidth of the system. An auxiliary amplifier, not specifically illustrated, is usually required to offset the attenuation of the delay member 19.

The output pulses of channels 1 and 2 now expanded, which comprise the two-pulse groups to be radiated, are combined in adder 20 for application to transmitter 21 in transmission channel 3. The adder 20 may be any of a number of simple electronic circuits arranged to feed a common load from two separate feeds. In view of the sequential nature of the outputs mutual isolation of the feeds is inherent when the output is derived from the anodes of separate amplifying tubes, and the primary requirement of the combining network is that of matching the feeds to their apparent loads.

The transmitter 21 is typically one using a power amplifier of the Klystron or travelling wave tube variety. The expanded input pulses are converted to the carrier frequency of the transmitter by heterodyning with a suitable stable local oscillator, not specifically illustrated in FIGURE 1.

The output of the transmitter 21 is suitably coupled to a directional antenna 4 through a transmit receiver device 22. It should be apparent that any of the large number of well-known devices may be utilized to perform the duplexing function. Conventionally, the TR device selected functions to connect the transmitter 21 to the directional antenna 4 during transmission periods and disconnects the reception channel 5 from the antenna during transmission periods. After periods of transmission, during which returning echo pulses are being received, the transmit-receive device functions to connect the common antenna 4 to the reception channel 5. It frequently also disconnects the transmitter during this period so as to increase reception efficiency.

The returning echo pulses resulting from impingement of the radiated expanded pulses upon a target are then passed to a receiver 25 in the reception channel 5. The Doppler shifts introduced into the two pulses of the group by a moving target may be utilized to derive information as to the speed of the moving target as well as location information since the dispersive affect of the filters tends to augment the indication of motion. The receiver 25 is essentially an amplifier having an input heterodyning frequency converter for restoring the expanded pulse to its original (10 megacycle) carrier frequency. Usually, the receiver employs the same stable local oscillator as is used to effect conversion of the initial pulse to the transmitter frequency so as to eliminate the effects of drift in the local oscillator which would create an erroneous appearance of target motion. The receiver 25 produces at its output expanded radio frequency pulses at the original low carrier frequencies and modified by the reflection process, which are applied to the inputs of channels 1 and 2.

The individual channels now fed expanded pulses, have the property which will be further explained below, by virtue of their mutually conjugate properties, of each reconstituting one of the original pair of pulses substantially into its initial short duration form, while at the same time further dispersing the other of the original pair of pulses into the background noise level. The reconstituted pulses are fed to a canceller 27 in the output channel to derive the desired MTI signal output. Display of the moving target information is attained by applying the MTI signal output to an appropriate indicator, not shown.

Considering now the operation of the circuit of FIG. 1 as a whole and referring to the pulses illustrated diagrammatically in FIGS. 3 and 4, the output of pulse source 10, which serves to produce the system drive signal, is shown in FIG. 3A. Upon application of the short duration drive pulse of FIG. 3A to phase-dispersive filters 12 and 16 in channels 1 and 2 respectively, the expanded linearly frequency modulated pulse waveforms illustrated diagrammatically in FIGS. 3B and 3C respectively are generated, the former having a negative phase-slope dispersion and the latter having a positive phase-slope dispersion, corresponding to the characteristics of the respective filters. The output of each filter has a time duration T. The outputs of filters 12 and 16 are applied through limiters 13 and 17 respectively to filters 14 and 18 respectively. The filters 14 and 18 have time-bandwidth products twice that of filters 12 and 16 and opposite phase-slope dispersions. Filter 14 thus serves to produce the signal illustrated in FIG. 3D which is of the same expanded duration T as the signal of FIG. 3B but has a positive phase-slope dispersion. Similarly, filter 18 produces the signal illustrated in FIG. 3E which is of expanded duration T and has a phase-slope dispersion opposite that of the signal illustrated in FIG. 3C.

The output of filter 18 is applied to delay line 19 and delayed $t$ seconds with respect to the output pulse of filter 14 prior to application to adder 20, the output of adder 20 comprising a two-pulse group of expanded pulses as illustrated in FIG. 3F.

The pulse group output of adder 20 is applied by transmitter 21 to antenna 4 for radiation.

During the group recurrence period, prior to application by pulse source 10 of another short duration pulse to channels 1 and 2, returning echoes resulting from impingement of the radiated pulse group upon targets, stationary or moving, are received by antenna 4 and applied through reception channel 5 to filters 12 and 16. A pair of returned echo pulses, resulting from impingement of the two-pulse group upon a moving target, will exhibit a relative time shift due to the Doppler effect, the time shift being amplified by employing frequency modulated pulses in implementing pulse compression techniques. A pair of returned pulses reflected from a stationary target exhibits no relative time shift.

The echo pulse group from a given target, which is applied to filters 12 and 16 by receiver 25, is illustrated in FIG. 4A and comprises pulses 35 and 36 corresponding to the radiated pulses generated in channels 1 and 2 respectively. Filter 12 of channel 1 operates upon the pulse group of FIG. 4A to produce the output illustrated in FIG. 4B for application to limiter 13. Since filter 12 is phase-matched to pulse 35, i.e., filter 12 has a negative phase-slope dispersion while pulse 35 has a positive phase-slope dispersion, pulse 35 is compressed in filter 12, as illustrated at 37 to reconstitute a short duration pulse like the original. Filter 12 is not phase-matched to pulse 36 and introduces additional phase dispersion into pulse 36 to expand pulse 36 into a signal having a duration of 2T, as illustrated at 38. Limiter 13 is effective to greatly reduce the amplitude of short pulse 37, as illustrated in FIG. 4D, elongated pulse 38 being unaffected by limiter 13. The pulses of FIG. 4D are applied to filter 14 which expands the residue of limited pulse 37 and, being phase-matched with pulse 38, compresses it, as illustrated in FIG. 4F to again reconstitute a short duration pulse like the original.

In channel 2, filter 16 has the same phase-slope dispersion as pulse 35 and is phase-matched to pulse 36, further expanding pulse 35 and compressing pulse 36 to produce waveforms 39 and 40, respectively, as illustrated in FIG. 4C. Limiter 17 greatly reduces the amplitude of pulse 40, while leaving expanded pulse 39 relatively unaffected, as shown in FIG. 4E. Filter 18, being phase-matched to pulse 39, compresses pulse 39 to reconstitute a short duration pulse like the original while expanding the residue of limited short pulse 40, further reducing its peak amplitude, as illustrated in FIG. 4G.

Compressed pulses 38 and 39 are separated in time by a period $x$, indicated in FIG. 4G. If pulses 38 and 39 represent reflections from a stationary target, $x=t$; whereas, $x=t\pm E$ if pulses 38 and 39 represent reflections from a moving target. The time increment E is a function of the Doppler shift and an additional time shift due to the employment of frequency modulated pulses. The latter effect is described in detail in the aforementioned IRE paper. The subtractive or additive nature of E is dependent upon the direction of radial movement of the target relative to the radar system. Delay 19 retards pulses 39 and 40 for a time period $t$, as illustrated in FIG. 4H.

Pulses 38 and 39 are subtractively combined in canceller 27 by inverting either pulse 38 or pulse 39 and algebraically adding the pulses. Thus, if pulses 38 and 39 represent reflections from a stationary target, $x=t$, pulses 38 and 39 are coincident, and canceller 27 will produce no output. If pulses 38 and 39 represent reflections from a moving target, $x$ is either greater or less than $t$ and pulses 38 and 39 are not coincident. Hence, canceller 27 will produce an output which is applied to appropriate display apparatus.

The canceller 27 may cancel either the undetected RF carrier waveform of the reconstituted pulses or the envelopes of the same. In the latter case, the canceller may take the form of a pair of reversely connected crystal diodes feeding a common resistance load. When the cancellation is done at the video, the direction of target motion, whether it is moving toward or away from the system is clear from the polarity of the received signal. In either case, any of a number of conventional circuits may be utilized.

In accordance with the invention, introduction of spurious phase variations between the signals applied to output channel 6 is precluded, and coherent relation of these signals insured, by virtue of the fact that each of the signals being applied to canceller 27 in output channel 6 has traversed identical paths in channel 1, channel 2, transmission channel 3 and reception channel 5. To illustrate, pulse 38 is derived in channel 1 in response to the return echo of a radiated pulse generated in channel 2 while pulse 39 is derived in channel 2 in response to the return echo of a radiated pulse generated in channel 1.

Thus, automatic compensation of phase variations or instabilities within the system is effected.

The arrangement illustrated in FIG. 1 assuming a 100 to 1 pulse compression ratio exhibits a theoretical discrimination between the desired reconstituted pulse (38, 39, FIG. 4) and the undesired pulse (37, 40, FIG. 4) of 43 decibels. Of this 43 decibel discrimination, approximately 20 decibels are attributable to the inclusion in each of the channels of the intermediate limiter and the second dispersive filter elements (elements 13, and 14 respectively in channel 1 of FIG. 1 and elements 17 and 18 respectively of channel 2 of FIG. 1). In certain situations, as where the pulse compression ratio is higher or where relatively few targets are expected, this additional discrimination is unnecessary and the invention may be embodied as shown in FIG. 5.

FIG. 5 is seen to comprise a pulse source 10 feeding two channels, the first of which includes a phase dispersive filter 12. In the second channel, a second phase dispersive filter 16 is included, also coupled to the pulse source 10 and having its output coupled to the delay element 19. The outputs of the elements 12 and 19 are both coupled to an adder 20 and a canceller 27. The output of the adder 20 is supplied to the transmitter 21, which together with the receiver 25, is coupled through a suitable transmit-receive device 22 to suitable common antenna means 4. The foregoing recited members may be identical to those previously described in FIG. 1 and for that reason, the same reference numerals have been retained as were applied to the corresponding elements in FIG. 1. At the output of receiver 25, however, a limiter 101 is provided in the FIG. 5 arrangement. This limiter may take the form of the limiters previously employed as elements 13 and 17 of FIG. 1. The purpose of this limiter is to remove the scintillation effects present when small variations in signal strength occur in target returns. The effect of the limiter is to normalize the successive magnitudes of the returns. It is usually set to clip the signal and noise well into the noise level and is such that substantially all-readable signals are clipped.

Figure 6:
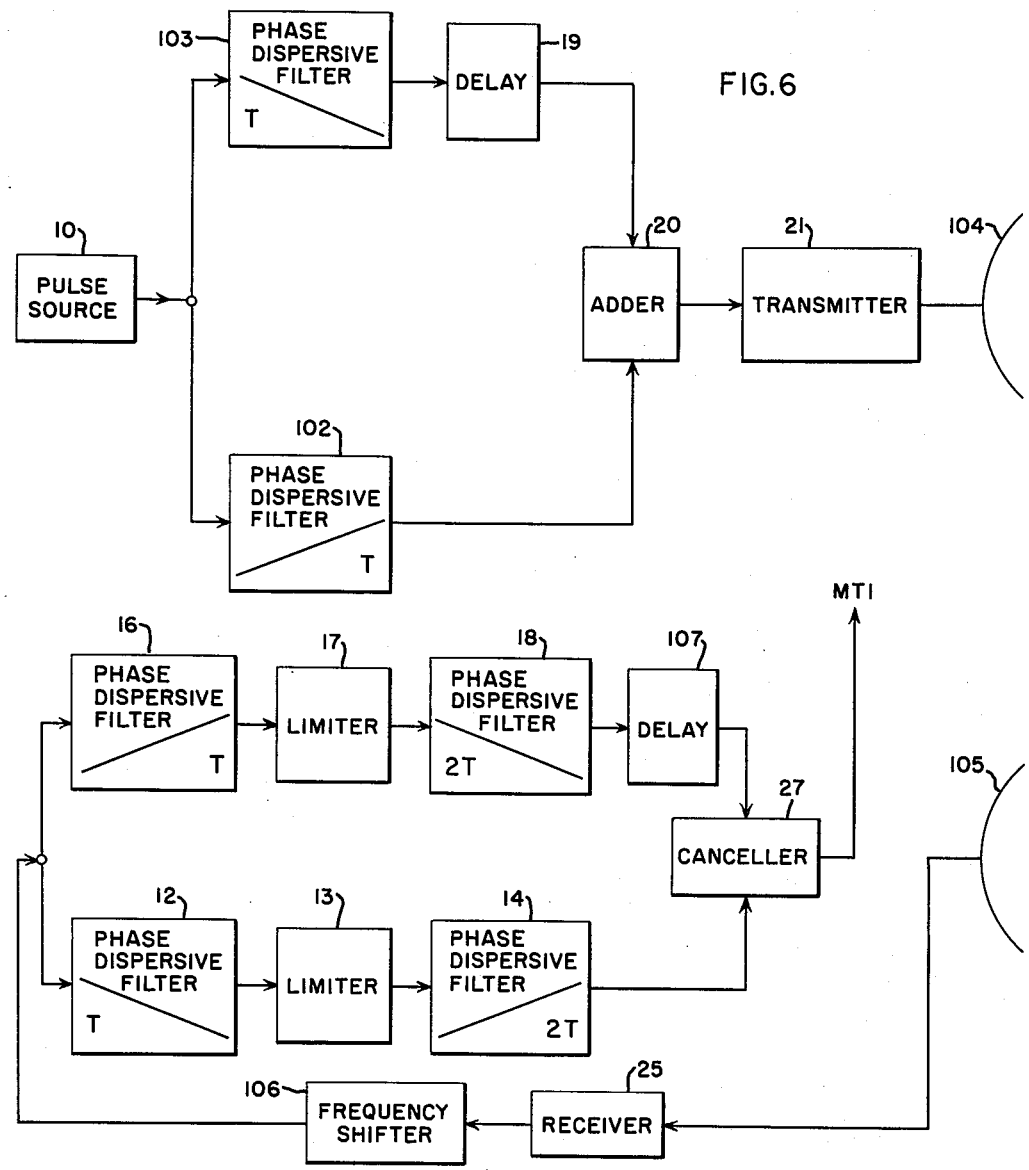
FIG. 6 is a block diagram representative of a radar system selectively responsive to target motion embodying the invention and distinguished by a separation of the transmitter and the receiver.

The invention may also be carried out in the general form illustrated in FIG. 6 wherein the transmission means and reception means are separated. The formation and transmission of the transmitted pulse occurs in the transmission means, illustrated at the upper half of the block diagram of FIG. 6. It includes the pulse source 10 feeding a radio frequency pulse to the phase dispersion filters 102 and 103, respectively in the first and second channels. The filter 102 may be identical to the filter 16 in FIG. 1 while the filter 103 may be identical to the filter 12 of FIG. 1. After passage through filter 103 the waveform is applied to the time delay means 19. The outputs of the elements 102 and 19 are applied to the adder 20 and thence to the transmitter 21 for radiation by the transmitting antenna 104.

The reception portion of the system is shown at the lower half of FIG. 6. The receiving antenna is shown at 103 feeding the echo returns to the receiver 25. The output of receiver 25 is then fed through the frequency shifter 106 to the first and second reception channels. The first reception channel includes a first-phase dispersive filter 12, a limiter 13 and a second-phase dispersive filter 14, all connected in cascade; and the second channel includes a phase-dispersive filter 16, a limiter 17, a second-phase dispersive filter 18 and a time delay element 107, all connected in cascade. The outputs of the two filters 14 and 18 are subtractively combined in the canceller 27 and fed to the moving target indicator.

The time delay filter 107 in the reception means may have the same delay as the filter 19 in the transmission means. The net transmission properties of the first reception channel comprising elements 12, 13 and 14 should be the conjugate of the transmission property of the second transmission channel having the element 103. Similarly the second reception channel should be the conjugate of the first transmission channel.

Arrangements as in FIG. 6, wherein the transmitter and receiver are separate require that both have highly stable frequency references. In the case where the transmitter and receiver are integrated, a single stable local oscillator is usually provided as illustrated in FIG. 5, element 108. The stable local oscillator then governs the carrier frequency of the transmitted pulse which has been heterodyned up to the final carrier frequency. When the received pulse is converted down to a suitable intermediate frequency for amplification in the receiver, the same stable local oscillator is used in the frequency down conversion process. The effect of this joint use of the local oscillator in beating up to transmitter-carrier frequency and then back down to intermediate frequency is to cancel out any frequency offset in the received pulse by instability of the local oscillator. Any frequency offset in the signal returns reaching the phase dispersive filters would create an illusion of motion on the part of stationary targets. To avoid this problem when the transmitter and receiver are separate, both devices should have highly stable local oscillators and additional means may be provided to bring about a more exact correspondence, as by the use of known stationary target returns.

In the event that cancellation is desired at other than zero radial target velocity, the arrangement in FIG. 6 employs the frequency shifter 106 coupled to the output of the receiver 25. In the usual case, the frequency shifter comprises a first and a second frequency converter, the one raising the frequency of the signal and second reducing the frequency to a value slightly offset from the input frequency. Adjustment of the frequency of this latter device may also be used to offset unassigned differences in frequency between the receiver and the transmitter to bring about precise cancellation of stationary target returns.

To this point, the embodiments of the invention which have been described have been those utilizing two pulse groups. The invention is equally applicable to pulse transmission in which groups of four to six and higher even numbers of pulses are employed.

Figure 7:
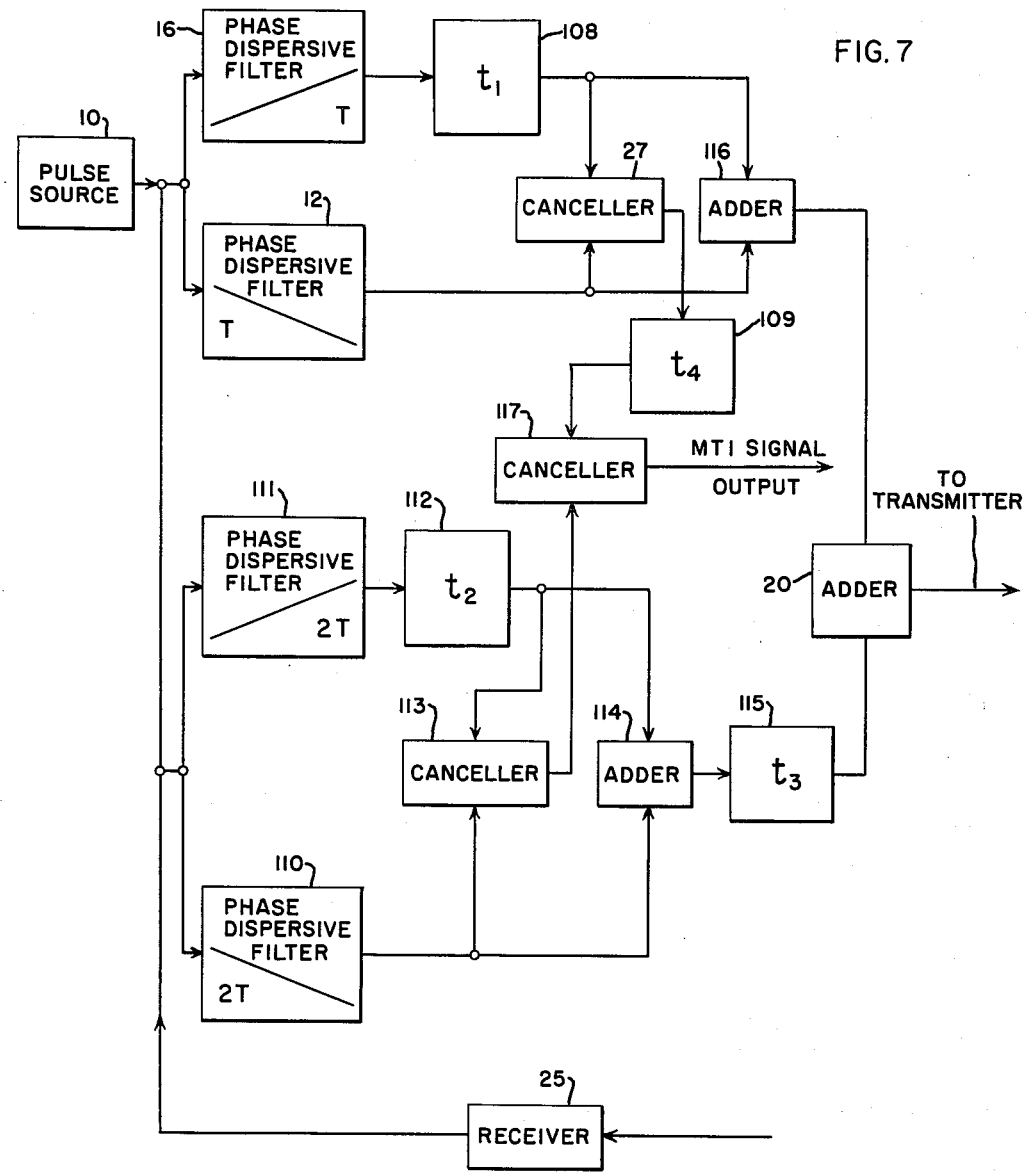
FIG. 7 is a block diagram representative of a moving target indicating radar system embodying the invention and adapted to employ pulse groups of four.

The advantage of using greater numbers of pulses per group is that this permits high resolution, compatible with the duration of the initial radio frequency pulses and bandwidth of the pulse synthesis networks, while at the same time giving higher signal to "clutter" ratios. The arrangement in FIG. 7 shows a simplified system wherein groups of four pulses are employed. A source of radio frequency pulses is shown at 10 in FIG. 7, coupled to four individual channels. In the first channel a dispersive delay filter 12 is employed. In the second channel a dispersive delay filter 16 and a time delay member 108 is employed. The outputs of the first and second channels are fed to the adder 116, and the output of which is fed to the adder 20 for ultimate transmission. The outputs of the first and second channels are also fed to a canceller 27 whose output is connected to an additional time delay element 109 and thence to the canceller 117 for ultimate use in reception.

The output of the pulse source 10 is also connected to a third channel having a phase dispersive filter 110. The phase dispersive filter 110 has a phase slope dispersion of the same sign as that of the filter 12 and a gain bandwidth product of twice that of the filter 12. The fourth channel, which is also connected to the pulse generator 10, includes a phase dispersive filter 111 and a time delay element 112. The phase-dispersive filter 111 has a phase-slope dispersion of opposite sign to that of the filter 110 and a gain bandwidth product equal to that of the filter 110. The outputs of the third and fourth channels are both fed to the inputs of the canceller 113 and to the inputs of the adder 114. The output of the adder 116 and the output of the adder 114, after suitable delay by the delay means 115, are then applied to the transmitter adder 20. By these combining paths, the four successive pulses are arranged in time sequence so that the pulse traversing channel 1 appears first; that traversing channel 2 appears second (after the time delay $t_1$ brought about by the element 108); that appearing from channel 3 appearing third by virtue of the time delay $(t_3)$ brought about by the time delay element 115, $t_3$ being greater than the time delay $(t_1)$ of the element 108; and finally the pulse traversing channel 4 which is delayed by both the delay elements 112 and 115 for a time total of $t_2$ and $t_3$. The total delays are such that the pulse group occupies less than the group repetition period.

The arrangement utilizing four pulses can also be carried out with limiters interposed between additional dispersive filters as first illustrated in FIG. 1 when a greater degree of discrimination is desired. In such an arrangement, the first channel would include a first dispersive filter of negative dispersion and given gain bandwidth (symbolized by −T), a limiter, a second dispersive filter of negative dispersion and given gain bandwidth (symbolized by −T), a second limiter, a third dispersive filter of positive dispersion and four times said given gain bandwidth (symbolized by 4T), a third limiter, and finally a fourth dispersive filter of negative dispersion and given gain bandwidth (symbolized by −T). The second channel may be like channel 1 except for a change in sign of each dispersive filter. In channel 2 the dispersive filters would be symbolized respectively as: T, T, −4T, and T. Channel 3 would have an initial filter of negative dispersion and twice said given gain bandwidth (−2T), a second filter of positive dispersion and unity gain bandwidth (T), a third filter of positive dispersion and twice said given gain bandwidth (2T), and a fourth filter of positive dispersion and said given gain bandwidth (T); three limiters being interposed between each of the respective filters. Channel 4 may be identical to channel 3 except for the sign of each of the dispersive filters: 2T, −T, −2T, −T.

Although the invention and its operation has been described with reference to a specific embodiment, the invention is not to be limited to this embodiment. Many modifications will be obvious to those skilled in the art. For example, active generation of the radiated two-pulse group may be utilized. In this event, the system of the invention, less the pulse source, may be employed for reception only. It is thus intended in the appended claims to claim all such variations as fall within the true scope of the invention.

What is claimed as new and desired to be secured by Letters Patent of the United States is:

1. In combination:
    (a) first means for periodically generating a pair of spaced-phase-modulated pulses at a predetermined group repetition frequency having a first and a second spectrum,
    (b) means for transmitting said pulses,
    (c) means for receiving echoes thereof,
    (d) a first channel coupled to said receiving means including first dispersive delay filter means having a transfer function which is the complex conjugate of the spectrum exhibited by the initial pulse of said pair,
    (e) a second channel coupled to said receiving means including a second dispersive delay filter means having a transfer function which is the complex conjugate of the spectrum exhibited by the trailing pulse of said pair,
    (f) time delay means in one of said channels selected to bring desired output pulses in said respective channels into timed correspondence.
    (g) means coupled to the outputs of said first and second channels for subtractively combining the outputs thereof.

2. The combination set forth in claim 1 wherein said initial pulse has a predetermined phase slope dispersion, and said trailing pulse of said pair has a phase slope dispersion which is the negative of that of said first pulse.

3. The combination set forth in claim 2 wherein said first and second pulses are parabolically phase modulated in a mutually conjugate manner.

4. The combination set forth in claim 2 wherein said first and second pulses are logarithmically phase modulated in a mutually conjugate manner.

5. The combination set forth in claim 1 wherein means are provided for limiting the amplitude of the received echo pulses.

6. In combination:
    (a) first means for periodically generating a pair of spaced phase modulated pulses at a predetermined repetition frequency having phase slope dispersion of which one is the negative of the other,
    (b) means for transmitting said pulses,
    (c) means for receiving echoes thereof,
    (d) a first channel coupled to said receiving means including:
        (1) a first dispersive delay filter means having a delay dispersion of the same sign as the phase slope dispersion of said first pulse;
        (2) limiting means coupled to the output of said first filter means, and
        (3) a second dispersive delay filter means coupled to the output of said limiting means, said filter means having a phase slope dispersion which is the negative of that of said first filter means and a time bandwidth product twice that of said first filter means,
    (e) a second channel coupled to said receiving means including:
        (1) a third dispersive delay filter means having a delay dispersion which is the negative of the phase sloped dispersion of said first pulse,
        (2) limiting means coupled to the output of said third filter means, and
        (3) a fourth dispersive delay filter means coupled to the output of said limiting means, said fourth filter means having a delay dispersion which is the negative of that of said third filter means and a time bandwidth product twice that of said third filter means,
    (f) time delay means coupled in one of said channels having a time delay selected to bring the desired output pulses in said respective channels into timed correspondence,
    (g) means coupled to the outputs of said first and second channels for subtractively combining the output pulses derived therefrom.

7. A moving target indicating radar transmission system comprising:
    (a) means for generating phase modulated radio frequency pulses in groups of two at a predetermined group repetition frequency, the initial pulse of each group having a first phase modulation and the terminal pulse of each group having a second phase modulation,
    (b) means for transmitting said pulses, and
    (c) receiving means for making a timing comparison between the initial and terminal pulses of a group.

8. A moving target indicating radar transmission system comprising:
    (a) means for generating phase modulated radio frequency pulses in groups of two at a predetermined group repetition frequency, the initial pulse of each group having a frequency spectrum which is the complex conjugate of the frequency spectrum of the terminal pulse of each group,
    (b) means for transmitting said pulses, and
    (c) receiving means for making a timing comparison between the initial and terminal pulses of a group.

9. A moving target indicating radar transmission system comprising:
   (a) means for generating short duration radio frequency pulses at a predetermined repetition rate,
   (b) first dispersive delay filter means coupled to said first means for imparting phase modulation to said pulse,
   (c) second dispersive delay filter means having a transfer function which is the complex conjugate of the transfer function of the first dispersive delay filter means coupled to said first means for imparting phase modulation to said pulse,
   (d) means combining said respective phase modulated pulses in spaced time sequence to form a two-pulse group signal, and
   (e) means for transmitting said pulses.

10. A moving target indicating radar transmission system as set forth in claim 9 wherein said dispersive delay filters provide a parabolic phase modulation.

11. A moving target indicating radar transmission system as set forth in claim 10 wherein said dispersive delay filters provide a logarithmic phase modulation.

12. A moving target indicating radar reception system adapted to respond to a signal comprising pairs of spaced phase modulated pulses reoccurring at a predetermined group repetition frequency, the respective pulses in each group having a first and a second spectrum, comprising:
   (a) means for receiving echoes of said pulses,
   (b) a first channel coupled to said receiving means including first dispersive delay filter means having a transfer function which is the complex conjugate of the spectrum exhibited by the initial pulse of said pair,
   (c) a second channel coupled to said receiving means including a second dispersive delay filter means having a transfer function which is the complex conjugate of the spectrum exhibited by the trailing pulse of said pair,
   (d) time delay means in one of said channels selected to bring the desired output pulses in said respective channels into timed correspondence,
   (e) means coupled to the outputs of said first and second channels for subtractively combining the outputs thereof.

13. The arrangement set forth in claim 12 wherein means are provided for adjustably offsetting the carrier frequency of the received pulse with respect to the carrier frequency of the transmitted pulse for selection of the target velocity at which cancellation occurs.

14. The arrangement set forth in claim 12 wherein means are provided coupled to said receiving means for controllably offsetting the carrier frequency of the pulse appearing in the output of said receiving means for adjustment of the target velocity at which cancellation occurs.

15. A moving target indicating radar reception system adapted to respond to a signal comprising pairs of spaced parabolically phase modulated pulses reoccurring at a predetermined group repetition frequency and having phase slope dispersion of which one is the negative of the other,
   (a) means for receiving echoes of said pulses,
   (b) a first channel coupled to said receiving means including
      (1) a first dispersive delay filter means having a delay dispersion of the same sign as the phase slope dispersion of said first pulse,
      (2) limiting means coupled to the output of said first filter means, and
      (3) a second dispersive delay filter means coupled to the output of said limiting means, said filter means having a delay dispersion which is the negative of that of said first filter means and having a time bandwidth product twice that of said first filter means,
   (c) a second channel coupled to said receiving means including:
      (1) a third dispersive delay filter means having a delay dispersion which is of the opposite sign as the phase slope dispersion of said first pulse,
      (2) limiting means coupled to the output of said third filter means, and
      (3) a fourth dispersive delay filter means coupled to the output of said limiting means, said fourth filter means having a delay dispersion which is the negative of that of said third filter means, and having a time bandwidth product twice that of said third filter means,
   (d) time delay means coupled in one of said channels having a time delay selected to bring the desired output pulses in said respective channels into timed correspondence, and
   (e) means coupled to the outputs of said first and second channels for subtractively combining the output pulses derived therefrom.

16. A moving target radar reception system utilizing four pulse groups of spaced phase modulated pulses reoccurring at a predetermined group repetition frequency, comprising:
   (a) means for receiving echoes of said pulses,
   (b) a first channel coupled to said receiving means including first dispersive delay filter means having a transfer function which is the complex conjugate of the spectrum exhibited by the initial pulse of said group,
   (c) a second channel coupled to said receiving means including a second dispersive delay means having a transfer function which is the complex conjugate of the spectrum exhibited by the second pulse of said group.
   (d) a third channel coupled to said receiving means including a third dispersive delay filter means having a transfer function which is the complex conjugate of the spectrum exhibited by the third pulse of said group,
   (e) a fourth channel coupled to said receiving means including a fourth dispersive delay filter means having a transfer function which is the complex conjugate of the spectrum exhibited by the fourth pulse of said group,
   (f) means for subtractively combining the time delayed output of one of said channels with the output of another of said channels and for subtractively combining the time delayed output of a remaining one of said channels with the remaining of said channels; and means for subtractively combining the first combination after suitable time delay with said second combination.

17. A moving target indicating radar transmission system utilizing four pulse groups at a predetermined group repetition frequency comprising:
   (a) means for generating short duration radio frequency pulses at said predetermined group repetition frequency,
   (b) a first channel coupled to said first means including first dispersive delay filter means for imparting a predetermined phase modulation to said pulse,
   (c) a second channel coupled to said first means including second dispersive delay means having a transfer function which is the complex conjugate of the transfer function of said first dispersive delay filter means,
   (d) a third channel coupled to said first means having a third dispersive delay filter means having a phase slope dispersion which is of the same sign as that of said first filter means and having a time bandwidth product twice that of said first filter means,
   (e) a fourth channel coupled to said first means having a fourth dispersive delay filter means having a transfer function which is the complex conjugate of the transfer function of said third filter means, (f) means for additively combining said phase modulated pulses in spaced time sequence.

18. A moving target indicating radar system comprising:
(a) means for periodically generating a two-pulse group at a predetermined repetition frequency comprising:
(1) a first channel for generating a first frequency modulated pulse having a predetermined phase-slope dispersion,
(2) a second channel for generating a second frequency modulated pulse having a phase-slope dispersion which is the negative of that of said first pluse and including means for delaying said second pulse for a predetermined period with respect to said first pulse to provide a second pulse coherently related to said first pulse,
(b) adding means for applying said first pulse and said second pulse to a transmitter for radiation of a two-pulse group, comprising said first and said second pulses,
(c) means for receiving the signals reflected from a target and applying them to said first and said second channels, and
(d) cancellation means connected to said first and said second channels for eliminating received information as to fixed targets whereby only information indicating movement of a target is derived.

19. A moving target indicating radar system comprising:
(a) means for periodically generating a two-pulse group at a predetermined repetition frequently comprising:
(1) a pulse source for producing drive pulses at the predetermined repetition frequency.
(2) a first channel connected to said pulse source for generating in response to each of said drive pulses a first frequency modulated pulse having a predetermined phase-slope dispersion,
(3) a second channel connected to said pulse source for generating in response to each of said drive pulses a second frequency modulated pulse having a phase-slope dispersion which is the negative of that of said first pulse and including means for delaying said second pulse for a predetermined period with respect to said first pulse,
(b) adding means for applying said first pulse and said second pulse to a transmitter for radiation of a two-pulse group comprising said first and said second pulses,
(c) means for receiving the signals reflected from a target and applying them to said first and said second channels, and
(d) cancellation means connected to said first and said second channels for eliminating received information as to fixed targets whereby only information indicating movement of a target is derived.

20. A moving target indicating radar system comprising:
(a) means for periodically generating a two-pulse group at a predetermined repetition frequency comprising:
(1) a pulse source for producing drive pulses at the predetermined repetition frequency,
(2) a first channel, including at least one phase-dispersive filter, connected to said pulse source for generating in response to each of said drive pulses a first linearly frequency modulated pulse having a predetermined phase-slope dispersion,
(3) a second channel, including at least one phase-dispersive filter, connected to said pulse source for generating in response to each of said drive pulses a second linearly frequency modulated pulse having a phase-slope dispersion which is the negative of that of said first pulse and including means for delaying said second pulse for a predetermined period with respect to said first pulse,
(b) adding means for applying said first pulse and said second pulse to a transmitter for radiation of a two-pulse group comprising said first and said second pulses,
(c) means for receiving the signals reflected from a target and applying them to said first and second channels, and
(d) cancellation means connected to said first and said second channels for eliminating received information as to fixed targets whereby only information indicating movement of a target is derived.

21. A moving target indicating radar system for periodically generating a two-pulse group at a predetermined repetition frequency comprising:
(a) a pulse source for producing drive pulses at the predetermined repetition frequency,
(b) a first channel connected to said pulse source for generating in response to each of said drive pulses a first frequency modulated pulse having a predetermined phase-slope dispersion, said first channel comprising:
(1) a first phase-dispersive filter having a predetermined phase-slope dispersion and a predetermined time bandwidth product connected to said pulse source,
(2) a limiter connected to said first filter,
(3) a second phase-dispersive filter having a phase-slope dispersion which is the negative of that of said first filter and a time bandwidth product twice that of said first filter connected to said limiter,
(c) a second channel connected to said pulse source for generating in response to each of said drive pulses a second frequency modulated pulse having a phase-slope dispersion which is the negative of that of said first pulse and including means for delaying said second pulse for a predetermined period with respect to said first pulse, said second channels comprising:
(1) a third phase-dispersive filter having a phase-slope dispersion which is the negative of that of said first filter and a time bandwidth product equal to that of said first filter connected to said pulse source,
(2) a limiter connected to said third filter,
(3) a fourth phase-dispersive filter having a phase-slope dispersion which is the negative of that of said third filter and twice the time bandwidth product of said third filter connected to said limiter,
(4) delay means connected to said fourth filter for delaying said second pulse a predetermined period with respect to said first pulse,
(d) adding means for applying said first pulse and said second pulse to a transmitter for radiation of a two-pulse group comprising said first and second pulses,
(e) means for receiving the signals reflected from a target and applying them to said first and said second channels, and
(f) cancellation means connected to said first and said second channels for eliminating received information as to fixed targets whereby only information indicating movement of a target is derived.

22. The arrangement set forth in claim 21 wherein said phase dispersive filters are parabolically phase dispersive for generation of linearly frequency modulated pulses.

23. The arrangement set forth in claim 21 wherein said phase dispersive filters are logarithmically phase dispersive for generation of hyperbolic frequency modulation.

24. A moving target indicating radar transmission system comprising:
(a) means for generating phase modulated radio frequency pulses in even numbered groups at a predetermined group repetition frequency, the pulses of each group having mutually distinct phase modulations,
(b) means for transmitting said pulses, and
(c) receiving means for making a timing comparison between members of the group to obtain target motion indication.

References Cited by the Examiner
UNITED STATES PATENTS
2,522,367   9/1950   Guanella _____ 343—17.2

CHESTER L. JUSTUS, *Primary Examiner.*

R. D. BENNETT, *Assistant Examiner.*